(No Model.) 6 Sheets—Sheet 1.

N. EATON.
COMBINED STEAM AND GAS GENERATOR AND ENGINE.

No. 517,606. Patented Apr. 3, 1894.

WITNESSES
Frank G. Parker
William H. Parry

INVENTOR
Norman Eaton

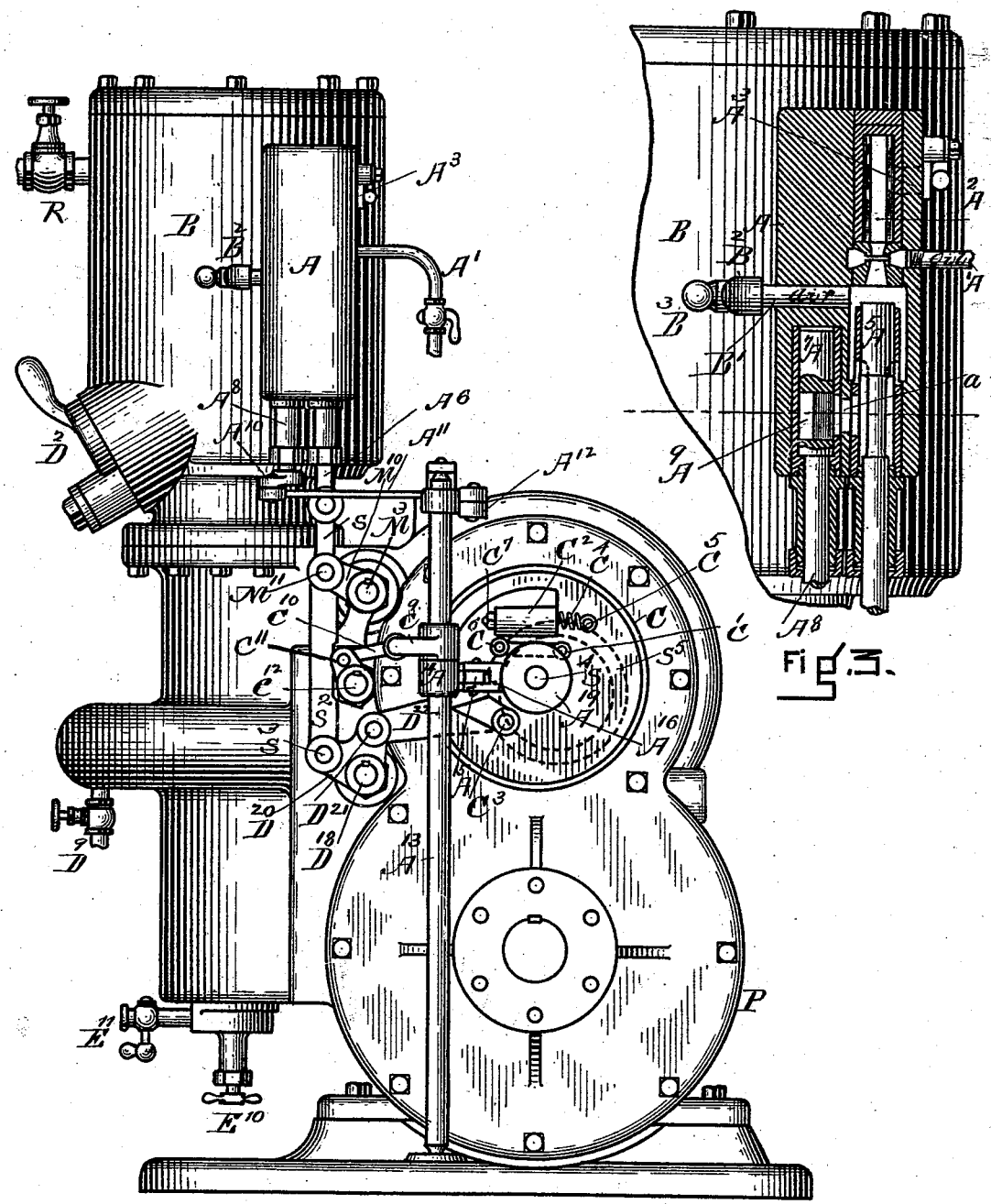

(No Model.) 6 Sheets—Sheet 4.

N. EATON.
COMBINED STEAM AND GAS GENERATOR AND ENGINE.

No. 517,606. Patented Apr. 3, 1894.

WITNESSES
Frank H. Parker
William L. Parry

INVENTOR
Norman Eaton (No Model.) 6 Sheets—Sheet 5.
N. EATON.
COMBINED STEAM AND GAS GENERATOR AND ENGINE.

No. 517,606. Patented Apr. 3, 1894.

WITNESSES. INVENTOR
Frank G. Parker Norman Eaton
William H. Parry (No Model.) 6 Sheets—Sheet 6.

N. EATON.
COMBINED STEAM AND GAS GENERATOR AND ENGINE.

No. 517,606. Patented Apr. 3, 1894.

WITNESSES.
Frank G. Parker.
William H. Parry.

INVENTOR.
Norman Eaton

UNITED STATES PATENT OFFICE.

NORMAN EATON, OF HOPEDALE, MASSACHUSETTS.

COMBINED STEAM AND GAS GENERATOR AND ENGINE.

SPECIFICATION forming part of Letters Patent No. 517,606, dated April 3, 1894.

Application filed February 1, 1893. Serial No. 460,543. (No model.)

*To all whom it may concern:*

Be it known that I, NORMAN EATON, of Hopedale, in the county of Worcester and State of Massachusetts, have invented certain new and useful Improvements in a Combined Steam and Gas Generator and Engine, of which the following, taken in connection with the accompanying drawings, is a specification.

My invention relates to an apparatus for generating combined gas and vapor under high tension, and in utilizing the same by an engine adapted by its peculiar construction to be driven by the said combined gas and vapor, and co-operate in the generation of the same.

The method of putting my invention in practice is illustrated by the following drawings, in which—

Figure 1:
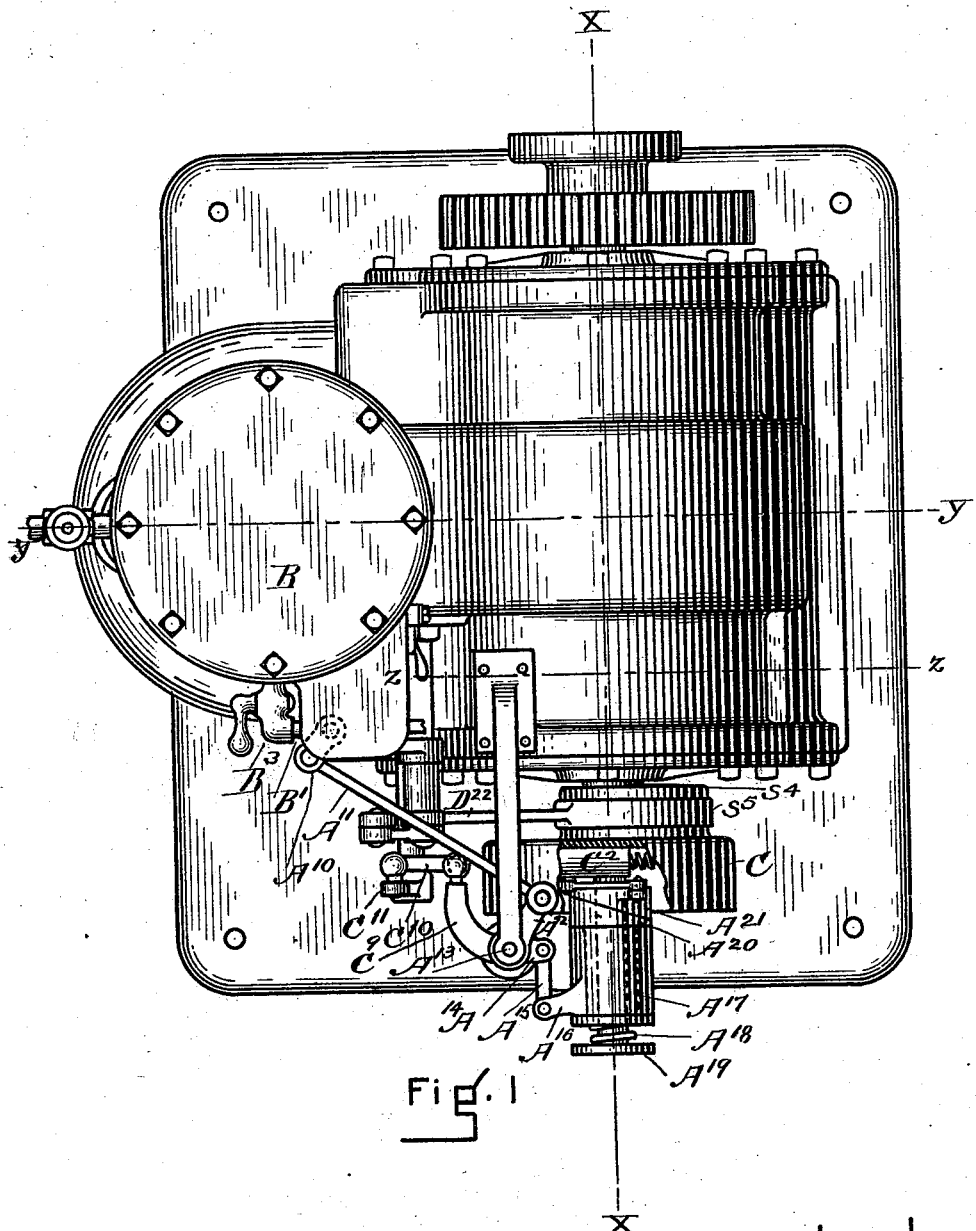
Figure 4:
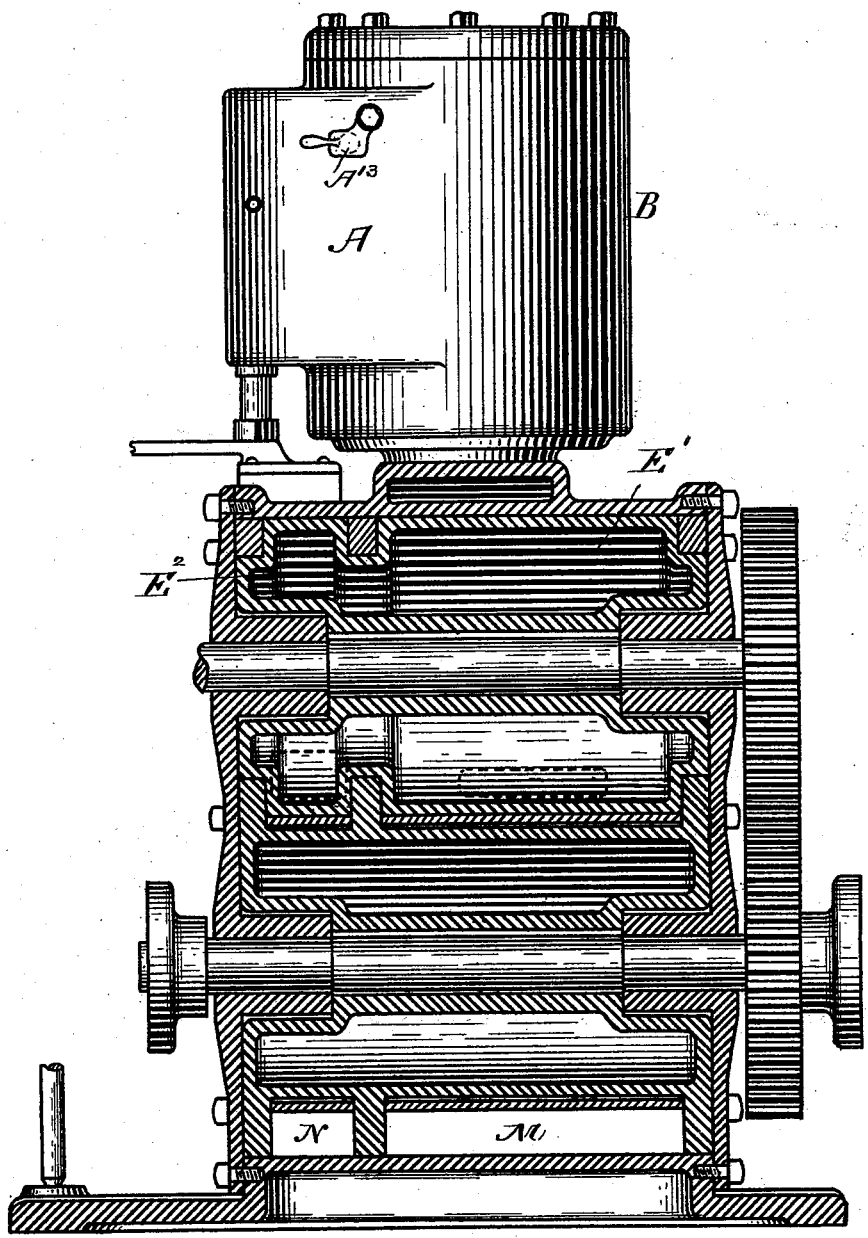
Figures 5, 6:
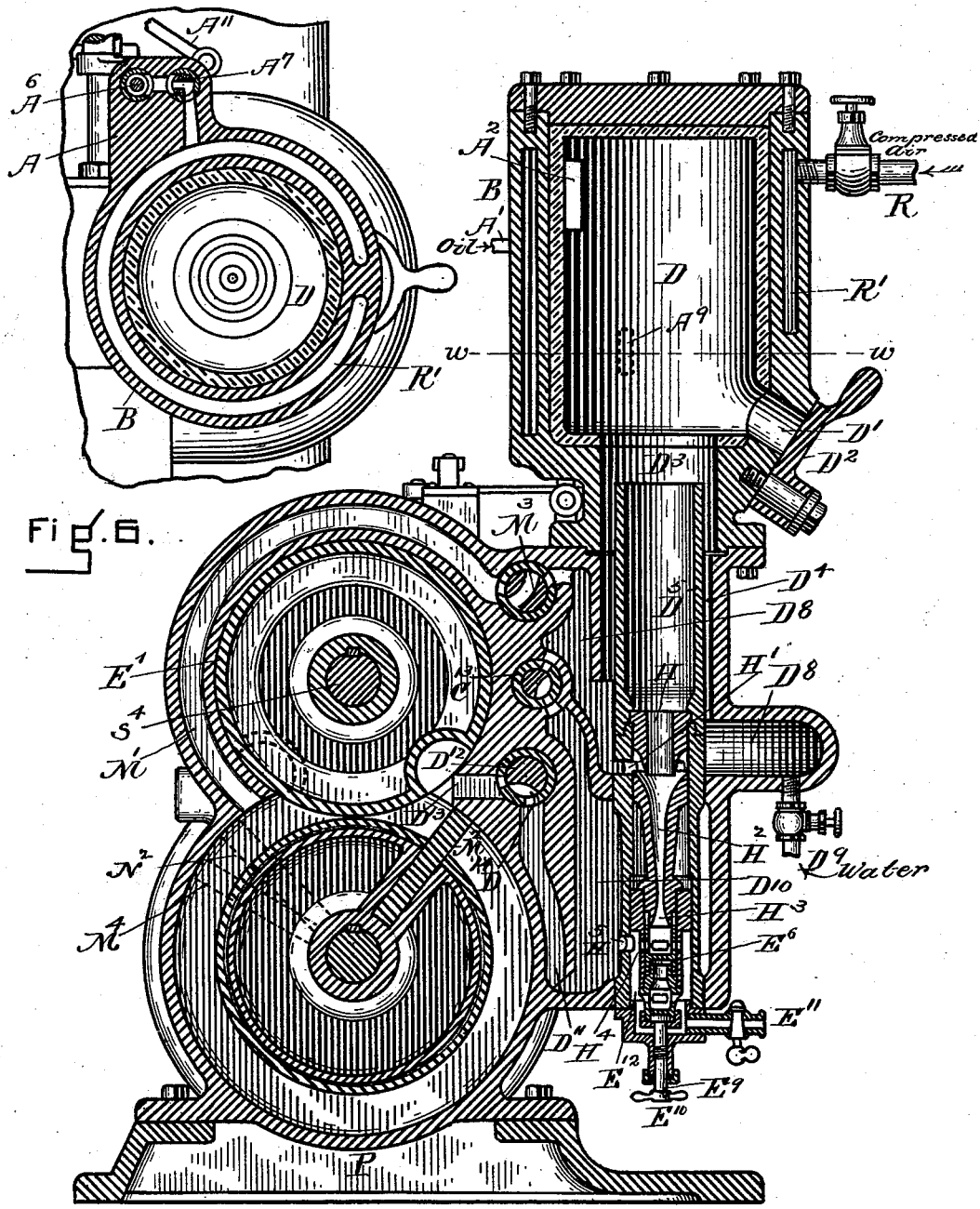
Figure 6:
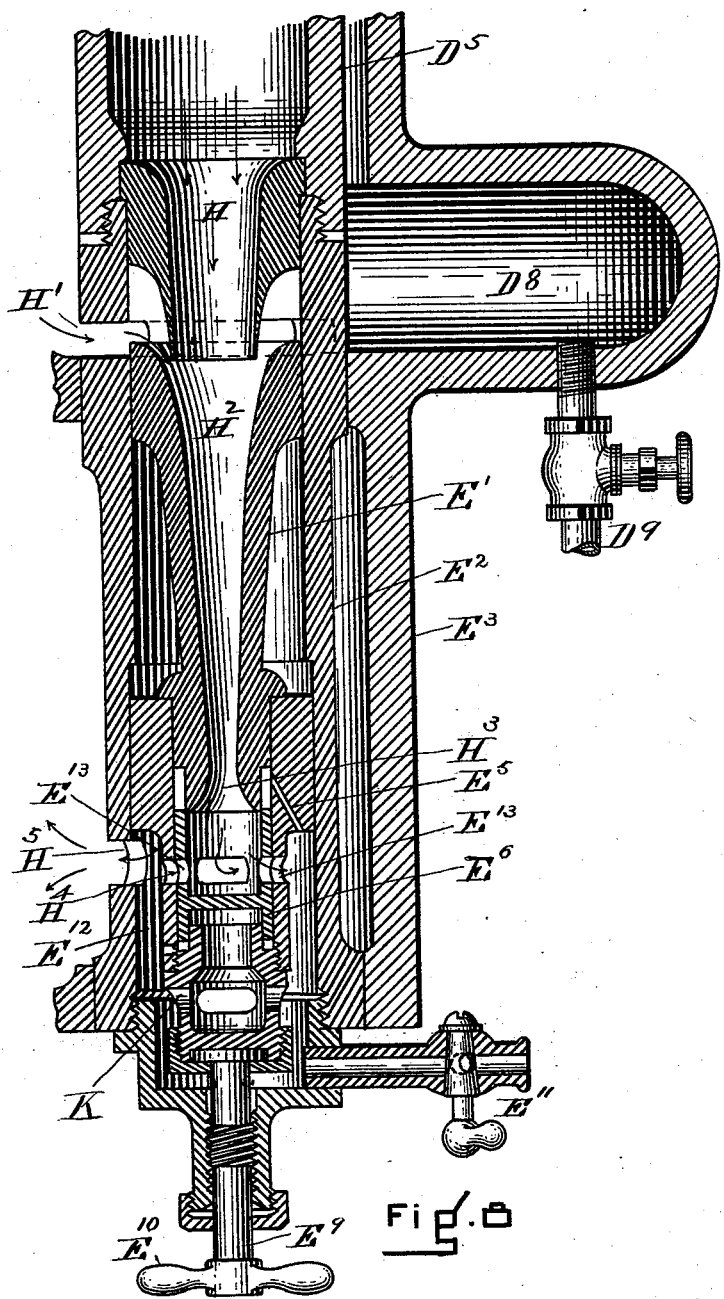
Figure 7:
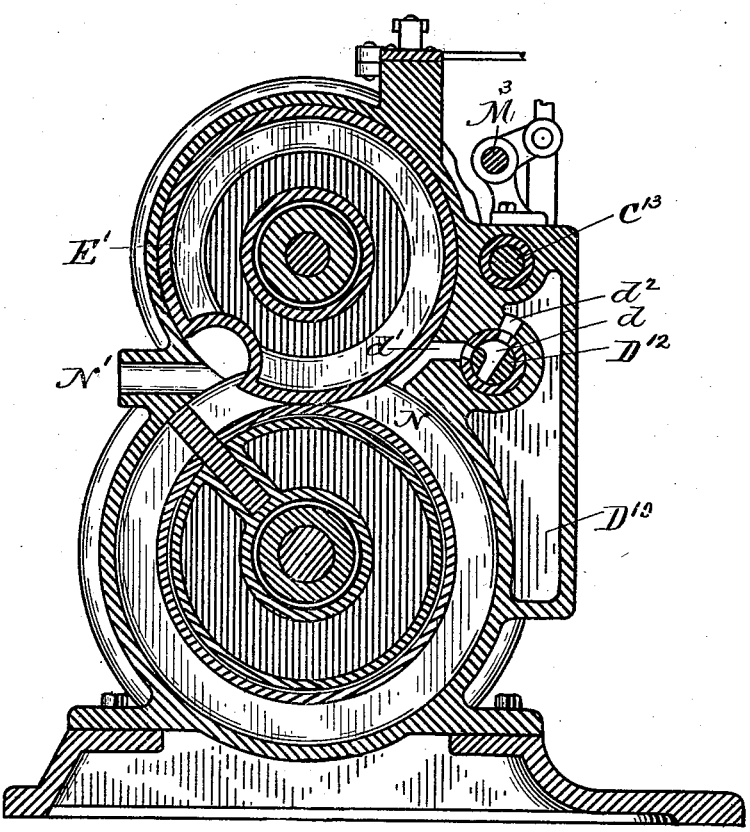

Figure 1 is a plan of my apparatus. Fig. 2 is an end elevation of my apparatus. Fig. 3 is a view partly in vertical section and partly in elevation, showing some of the details. Fig. 4 is a vertical section taken on line $x$—$x$ of Fig. 1. Fig. 5 is a vertical section taken on line $y$—$y$ of Fig. 1, looking from the rear. Fig. 6 is a horizontal section taken on line $w$—$w$ of Fig. 5. Fig. 7 is a vertical section taken on line $z$—$z$ of Fig. 1, looking from the rear. Fig. 8 is an enlarged view in vertical section of the injector and its connecting parts; these parts are also shown in Fig. 5.

In general terms, my invention consists in adapting mechanism to admit of the performance of the following succession of operations.

Liquid fuel and air are admitted to the furnace and ignited, combustion continuing until the furnace has become sufficiently hot to maintain combustion with the continued influx of fresh fuel. The heated products of combustion, mingled with steam generated by contact of water with said products, are now forced, by their own pressure, through an injector (and by the said injector mingled with watery spray and vapor) into a steam box or chamber, said chamber being divided into two parts, one extending considerably above the other, each having a valved port leading respectively into divisions of a cylinder of the engine; the lower of the said parts being connected to a valved port that leads to the main division of the engine, and is adapted to utilize the heavier part of the product of the generator, while the other part is connected to a valved port that leads to the smaller division of the engine, and is adapted to utilize the lighter portion of the products of the generator.

Each of the divisions of the engine cylinder has an exhaust port; that of the cylinder that takes the lighter or more gaseous portion of the product of the generator opens into the open air, while that of the division that takes the heavier vapor portion of the product of the generator leads through passages back to the generator at a point near the injector, and is again mixed with the products of combustion and the watery spray, and again passes, with the other products of the generator, into the steam chamber, to undergo a repetition of the process above described.

I will now give a mechanical description of my device.

B, in the drawings, is a casing within which the furnace or fire chamber D (Figs. 5 and 6) and its connected parts are contained. Attached to the furnace casing I have a box A (Figs. 2, 3, and 6), within which are located a piston-valve $A^5$ (Figs. 3 and 6), which controls the supply of air to the furnace. And a rotary valve $A^7$, which serves in connection with other parts to regulate the speed of the engine.

P represents the main cylinder of the engine.

Referring to Figs. 5 and 6, D represents the fire chamber of the furnace. This chamber is lined with fire brick, or some suitable refractory material, and is surrounded by double walls, between which is the chamber $R'$; this chamber $R'$ serves to receive the compressed air from the pipe R, and to heat it previous to its passage through the opening $A^2$ (Figs. 3 and 5) to the furnace. (This will be explained hereinafter.)

$D'$ is a manhole, closed by the cover $D^2$.

Liquid fuel is admitted to the passage $A^2$ (see Figs. 3 and 5) by a supply pipe $A'$, and is ignited through an opening at $A^3$, the combustion taking place in the furnace chamber D. While the furnace chamber D is being heated, air may be freely admitted through the pipe $B'$ (Fig. 3). The air pipe $B'$ communicates directly with the chamber $R'$, which is supplied with air, under pressure, through the pipe R (Fig. 5).

$B^3$ is a hand valve, by means of which the air pipe $B'$ $B^2$ may be closed or opened at will.

$A^5$ (Fig. 3) is a valve which serves to admit or cut off the supply of air from the chamber $R'$ through the port $A^9$ and passage $a$. This valve is caused to operate by the following described mechanism: Dotted lines at $S^5$ (Fig. 2) represent an eccentric attached to the shaft $S^4$ of the counter cylinder $E'$ $E^2$ (see Figs. 2, 4, 5, and 7). This eccentric $S^5$ operates the arm $D^{22}$, which is connected by a pin $D^{21}$ to a rocker lever $D^{20}$, said rocker lever $D^{20}$ being keyed to the extension $D^{18}$ (Fig. 2) of the shaft of the rotating valve $D^{12}$ (Fig. 5), and is connected by the pin $S^3$ to the link $S^2$, and through the link S to the stem $A^6$ of the valve $A^5$ (see Figs. 2 and 3); thus at each rotation of the counter cylinder $E'$ both the valve $A^5$ and the valve $D^{12}$ will be operated.

The air supply governor valve $A^7$ (Figs. 2, 3, and 6) is closed and opened by being rotated upon its own axis. The pressure governing valve $C^{13}$ (Fig. 5) is also closed and opened by being rotated. Both of the above valves ($A^7$ and $C^{13}$) are controlled by the same mechanism, which I will now describe. The shaft $S^4$ of the counter cylinder $E'$ $E^2$ (one of the cylinders of the rotary engine) has a disk C attached to it. To the disk C a swinging weight $C^2$ is connected by a pivot $C^3$ (Fig. 2); this weight $C^2$ is arc shaped, as shown, its free end being held by a spring $C^4$, which is connected to it by a fastening at $C^7$, the other end of the spring being connected to the disk C by a pin $C^5$. It is to be understood that as the disk C is rotated rapidly, the weight $C^2$ will swing outwardly, its outward motion being checked and regulated by the spring $C^4$. A link pivoted to the weight $C^2$ at $C^6$ connects the said weight (by a pin $C'$) to a side cam piece $A^{21}$, so that as the weight $C^2$ is caused to swing outward by the rapid rotation of the shaft $S^4$, it causes the side cam piece $A^{21}$ to rotate relatively on the said shaft $S^4$. $A^{20}$ is a companion cam to $A^{21}$, but cannot rotate independent of the shaft $S^4$, although it can slide longitudinally on the said shaft. The companion cam $A^{20}$ carries a sleeve $A^{17}$, loosely fitted on to it, and held by a spring $A^{18}$ and flange $A^{19}$. From the above it may be seen that when the weight $C^2$ is thrown outwardly by the rapid rotation of the shaft $S^4$, it will give the side cam $A^{21}$ a relative motion in respect to the cam $A^{20}$, and force it (the cam $A^{20}$) along the shaft $S^4$, taking with it the sleeve $A^{17}$, which in turn, acting through the arm $A^{16}$ and link $A^{15}$ (see Figs. 1 and 2) and arm 14, will cause the rocker shaft $A^{13}$ to make a partial rotation. Motion is communicated from the rocker shaft $A^{13}$ through the arm $A^{12}$, link $A^{11}$, and crank arm $A^{10}$ to the rotating valve $A^8$ $A^7$ (see Fig. 3), by means of which the passage of air through the opening $A^9$ is regulated. The pressure governing valve $C^{13}$ (Figs. 2 and 5) is operated by the rocker shaft $A^{13}$ through the arm $C^9$, link $C^{10}$, and arm $C^{11}$ (see Fig. 2). The main exhaust valve $M^3$ (Figs. 2, 5, and 7) is operated by the link S (previously referred to) acting through the pin $M^{11}$ and the arm $M^{10}$. After the furnace becomes sufficiently heated to maintain combustion of the fuel that enters through the passage $A^2$, then the air valve $B^2$ may be closed, and the following action will take place: the product of combustion will pass downward into the passage $D^3$, and downward through and around the large pipe $D^5$; that part which passes around the pipe $D^5$ comes in contact with water in the steam generator $D^8$ (water being admitted through the pipe $D^9$) and converting some of this water into steam, or at least heating it. Another portion passes down through the passages H $H^2$ (see Figs. 5 and 8) of the injector. This action will draw water or steam from the reservoir $D^8$ through the passage $H'$. Now this combination of water, steam, and gases is discharged through the nozzle $H^3$ and openings $H^4$ $H^5$ into the chamber $D^{10}$ (see Figs. 5 and 7), from whence they pass either through passage $D^{11}$ and valve passage $D^{14}$ in rotating valve $D^{12}$ and passage $D^{13}$ into steam cylinder M, or directly through passage $d^2$ (see Fig. 7) into a valve opening $d$ made in the farther end of the rotating valve $D^{12}$, thence through passage $d'$ into gas engine N (Fig. 7), one or the other of the valve passages being always open. That which passes through the gas engine exhausts into the atmosphere through the opening $N'$, while that of the steam engine passes through exhaust passage $M'$ and exhaust valve $M^3$ into chamber $D^8$; the water settles in chamber $D^8$, and the steam rises into the furnace through annular passage $D^4$. After the engine is started, the cock $B^2$ $B^3$ for air blast is closed. The air blast valve $A^5$, worked by eccentric, is shown as about to close. It starts to open when steam piston or revolving head $M^2$ (Fig. 5) is back of position shown at about $M^4$ (Fig. 5). At about this position ($M^4$) of steam head $M^2$ the exhaust valve $M^3$ closes, and remains closed through the dead part of rotation, till $M^2$ has got a little farther in its rotation than shown in the drawings. The valve opening $D^{13}$ of steam cylinder is closed only while head $M^2$ is passing the dead part of its rotation (from a position just before it gets to the exhaust passage $M'$ from cylinder, to that shown.) The corresponding positions of gas cylinder valve opening $d$ (see Fig. 7) are: when steam rotating valve opening $D^{14}$ is open, valve opening $d$ closes (as shown in Fig. 7), and remains closed through the dead part of rotation, or until the head $N^2$ gets to a position similar to that of steam head $M^2$. It then opens through some more than a quarter of a rotation; then shuts through some less than a quarter of a rotation; then opens again on the last of the rotation. It is when the gas engine head $N^2$ is in this arc that the blast from the valve $A^5$ is let on. The heads $M^2$ and $N^2$ are always in the same relative positions, as they are keyed to the same shaft. When the machine is fairly going, the exhaust steam is pushed into the furnace by the steam head $M^2$; then the blast is let on, which heats and drives the exhaust, together with the gases, as above stated, through the injector, carrying along condensing water from chamber $D^8$, and discharging into chamber $D^{10}$, wherein the pressure has been reduced by the action of the engine. Thus the pressure in the circuit is unbalanced, so that by the impact of the jet from the injector a short period (the engine is intended to run at a high speed) of high pressure is created in the chamber $D^{10}$, so that the tendency will be for the gases to hold the water intact under this pressure till steam engine valve passage $D^{13}$ opens, when it is pushed through said passage into engine by the compressed gases. Then gas engine valve opening $d'$ (Fig. 7) opens, and lets out what remains in $D^{10}$, the steam engine valve being still open for a while. There would be practically a continuous flow through the injector, with quick intermittent discharges.

The construction and arrangement of the injector is more fully shown in Fig. 8, which I will now describe in detail. H represents the passage for the products of combustion into the inlet of the injector; the blast through H draws water and watery vapor from the chamber D through the openings $H'$; thence the mingled products of combustion, steam and spray are forced downward through the passage $H^2 H^3$ of the nozzle $E'$ (said nozzle $E'$ being held by the pipe $E^2$, which in turn is held by the casing $E^3$), and through the openings $H^4$ into the annular chamber $E^{12}$; thence through the opening $H^5$ into the chamber $D^{10}$, from which it passes into the engine (see Fig. 5). A floating or cushion check valve $E^6$ is placed in the extension $E^4$ of the injector nozzle; this check valve $E^6$ has openings $E^{13}$ to correspond with the openings $H^4$ in the extension $E^4$, so that a movement of the check valve will cause a contraction or expansion of the passages from the injector to the chamber $E^{12}$. The check valve $E^6$ is subjected on its under side to the pressure in the chambers $E^{12}$ and $E^{10}$ through the openings at K, so that when the pressure in the chamber $D^{10}$ exceeds that in the injector, the check valve $E^6$ will be forced upward, and thus close or partly close the openings $H^4$; but as soon as the pressure in the chamber $D^{10}$ falls, then the pressure of the injector will overcome it, and the check valve $E^6$ will fall and open the passage $H^4$.

$E^5$ is a vent to allow the check valve to work freely.

$E^{10}$ is a hand wheel on the screw $E^9$, which serves to adjust the injector.

The pet cock $E^{11}$ is for the purpose of drawing off any water of condensation that may accumulate, and also for taking off the back pressure from the chamber $D^{10}$.

I claim—

1. In a combined steam and gas generator and engine, the combination of a compressed air chamber, a combustion chamber, a device for admitting and igniting fuel, and an injector device, as described: with a separating chamber, and valves opening from said separating chamber to the divisions of a combined rotary engine, and a combined rotary engine adapted to operate as described; substantially as described and for the purpose set forth.

2. In a combined steam and gas generator and engine, the combined rotary engine having divisions M and N, the division N having exhaust port direct to the open air, and division M having exhaust leading back to the combustion and generating chambers, substantially as described and for the purpose set forth.

3. In a combined steam and gas generator and engine, the combination of the combustion chamber and injector leading from the same, and an annular passage surrounding said injector and connecting with a water chamber, the injector adapted to receive the products of combustion, and mingling the same with the vapor and spray from the water chamber, injecting the same into the valve chamber $D^{10}$ of the engine; substantially as described and for the purpose set forth.

4. In a combined steam and gas generator and engine, a vertical chamber adapted to receive the combined steam and gas from the generator in combination with valve passages, one opening from the lower part of said chamber and adapted to receive the heavier parts of the combined steam and gas, and deliver it to one division of the cylinder of the engine, and another valve passage adapted to receive the lighter parts of the combined steam and gas, and deliver the same to another part of the combined engine; substantially as described and for the purpose set forth.

5. In a combined steam and gas generator and engine, a combined rotary engine having a rotating cylinder divided laterally, each part provided with a steam head: in combination with a counter cylinder adapted to operate with the aforesaid cylinder, all substantially as described and for the purpose set forth.

In testimony whereof I have signed my name to this specification, in the presence of two subscribing witnesses, on this 21st day of January, A. D. 1893.

NORMAN EATON.

Witnesses:
FRANK G. PARKER,
WILLIAM H. PARRY.